Nov. 12, 1946.  R. I. PATTERSON  2,410,996
GRAIN UNLOADING AND LOADING MECHANISM
Filed March 15, 1944  4 Sheets-Sheet 1
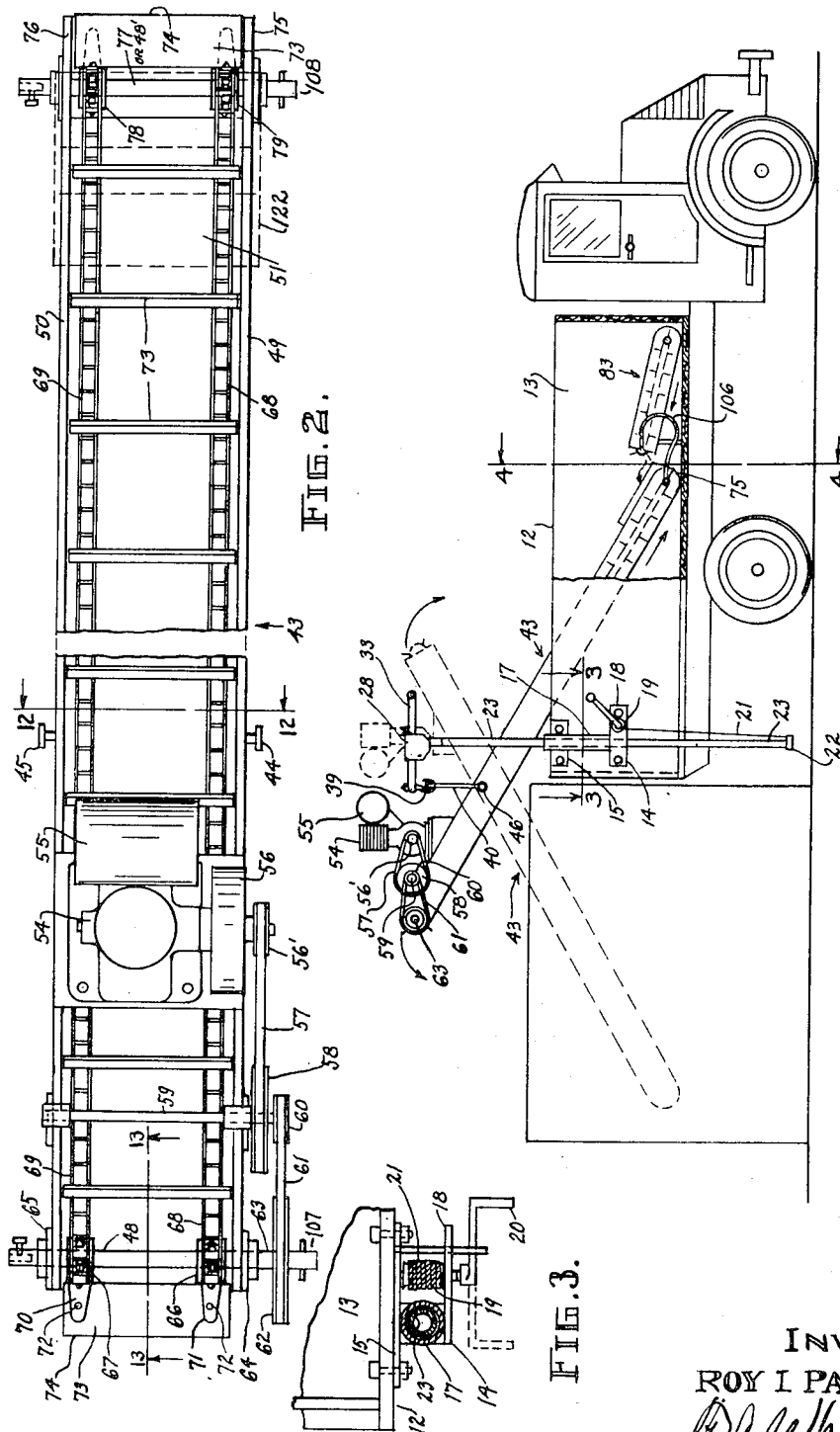
INVENTOR
ROY I PATTERSON
ATTORNEY

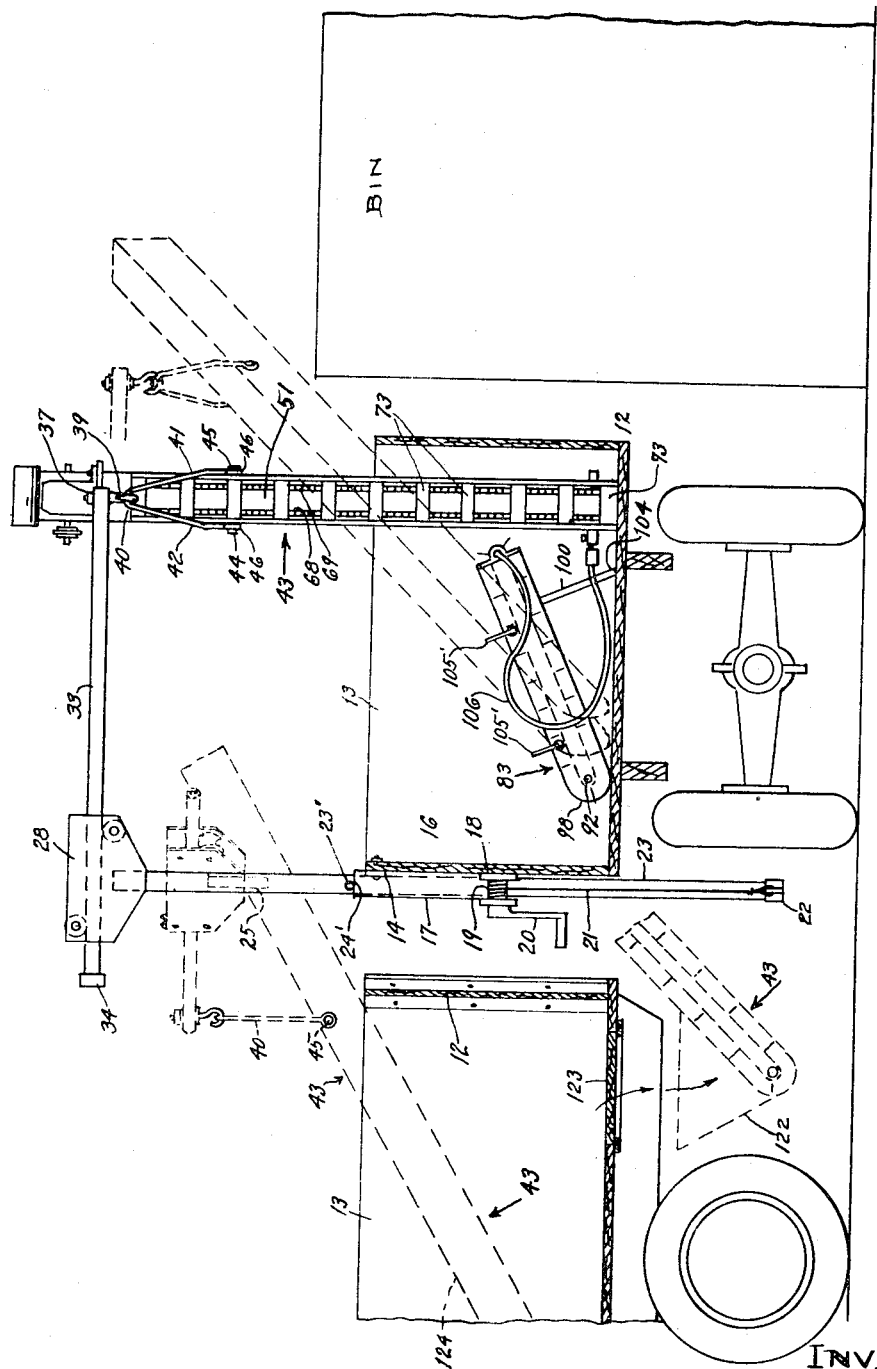

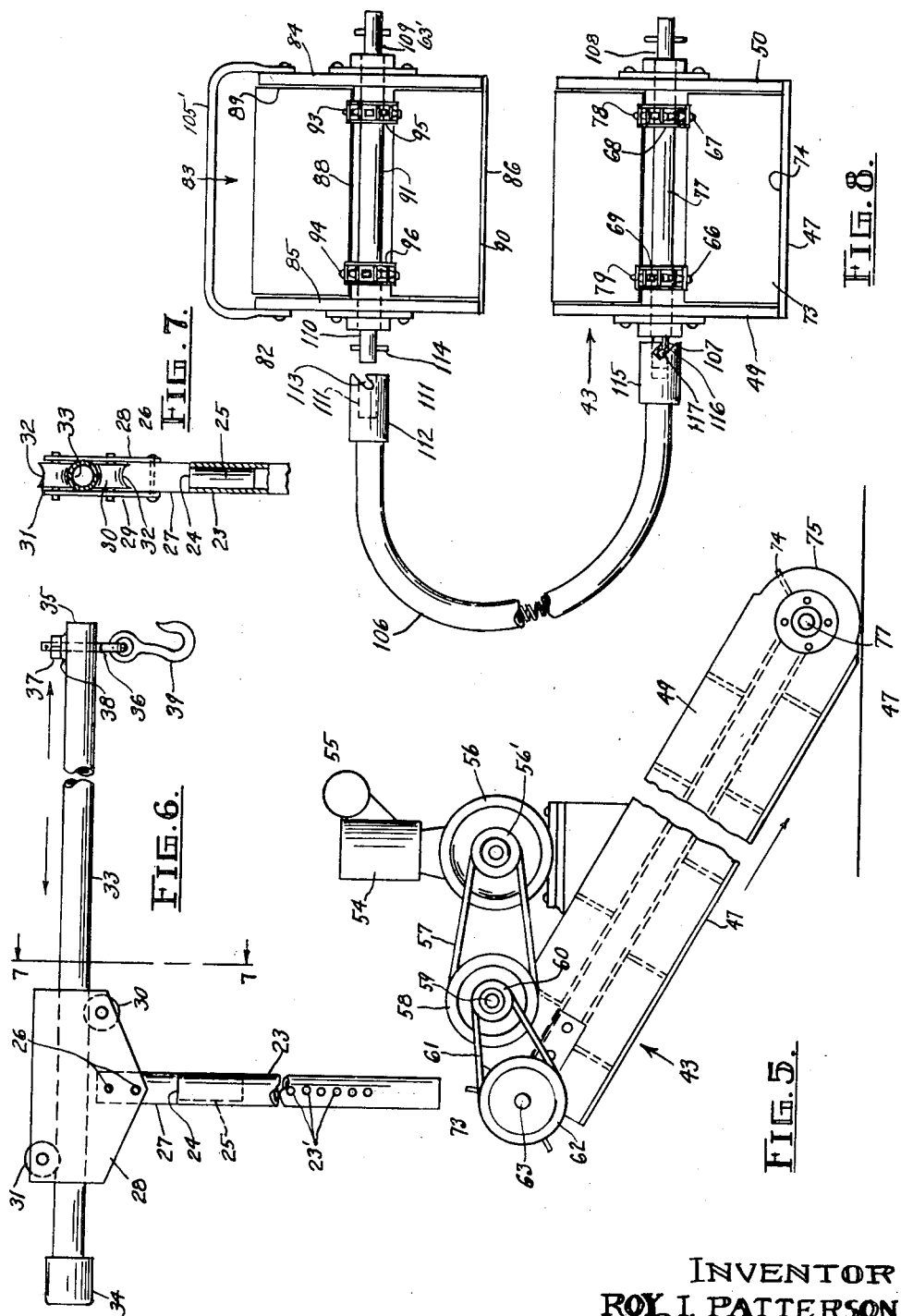

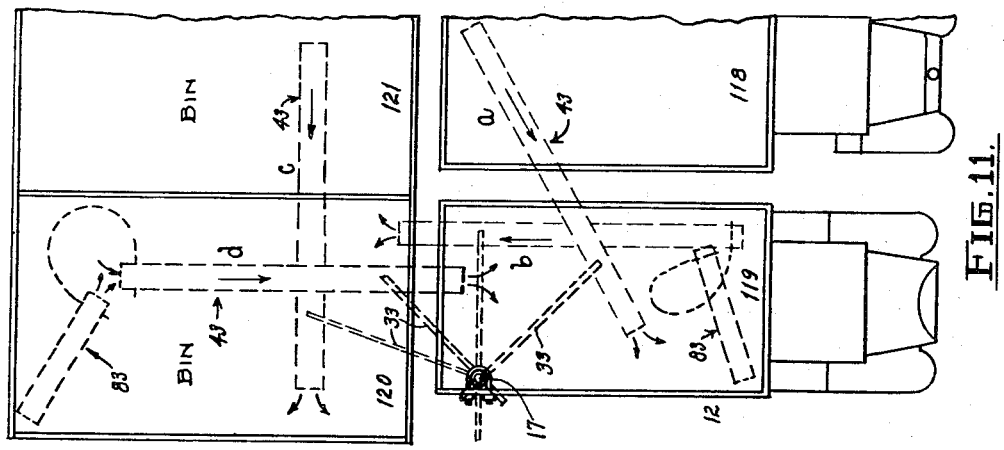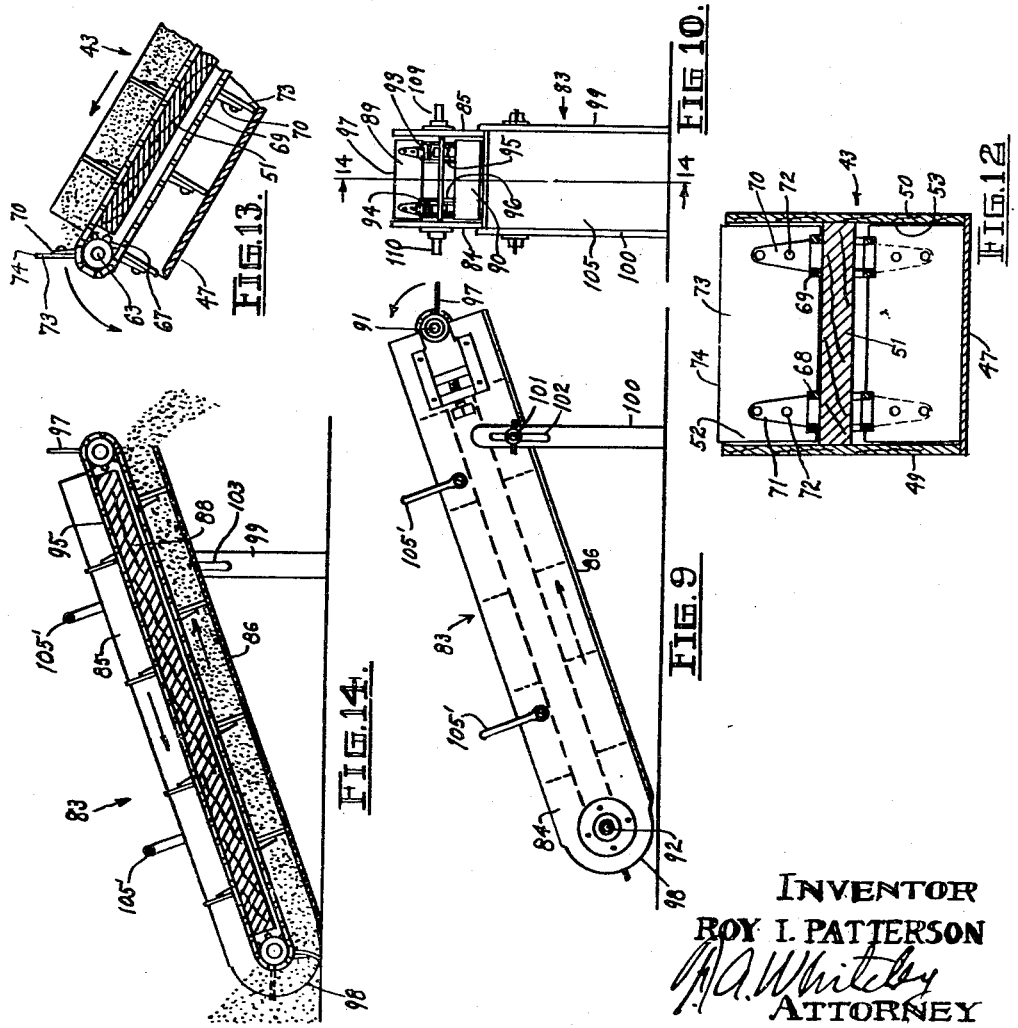

Patented Nov. 12, 1946

2,410,996

UNITED STATES PATENT OFFICE 2,410,996

GRAIN UNLOADING AND LOADING MECHANISM

Roy I. Patterson, Golden Valley, Minn.

Application March 15, 1944, Serial No. 526,831

4 Claims. (Cl. 214—83)

My invention relates to grain unloading and loading mechanism and has for its object to provide means for picking up grain from any source of storage, such for example as a bin, a truck body, or even upon any ground surface, and for transferring the grain so picked up to any desired receptacle such as a bin or a truck body, said pick-up and delivery involving a requisite amount of elevation for the purpose desired. While the object of the invention is stated as being applicable to grain, it is also applicable effectively to other granular materials, such as fine coal, fine gravel, bulk coffee, and other similar materials.

As is well known in reference to the application of the invention to the handling of grain, the grain is grown on farms of various sizes, threshed, and stored. The storage of the grain may be at a central storage plant, generally referred to as an elevator, or may be in granary bins provided on the farm itself. The storage of grain on the farm often is desirable, because a better price can be secured for the grain at some considerable time after harvest.

At the present time a very considerable part of the grain grown in at least many important grain growing regions is harvested by means of what is known as a combine, which cuts, threshes, and substantially cleans the grain in the single operation effected by driving the combine alongside of the standing grain. The grain thus harvested is usually transferred to a light truck driven alongside the combine as it harvests the grain, or it may be put in long, strong sacks at the time of harvest. The sacking, however, is expensive in the use of both material and labor and more satisfactory and less expensive results can ordinarily be obtained by delivering the grain direct from the combine in bulk to the box of the truck or wagon which accompanies the combine.

From this truck the grain must be transferred usually to a larger truck, which is in the nature of a storage truck, and which may be driven to the central elevator for discharging the grain there, or to the farm granary for transfer to the bin or bins therein.

When combines are not used, the grain is first stacked at a central point and then threshed by a large threshing machine, and the grain from the threshing machine may either be sacked or delivered in bulk to a truck or wagon box as in the case of the use of the combine.

In any case where the grain has been delivered in bulk into a truck box or a wagon box, either one of small size for subsequent transfer to a larger size, or from the larger size to a transportation truck or wagon box, there is a problem in getting the grain out of the box either to the farm granary bins or to the transportation truck for hauling it to the elevator. In the latter case there is customarily a dumping arrangement which permits the bulk grain to be dumped directly into a pit from which it is carried upward by suitable elevating legs to the the bins of the elevator, but even in central elevator plants there may be occasion to transfer the grain from a transportation truck directly to elevator bins or to other trucks available for that purpose or even to freight cars for immediate shipment, in any of which cases the same problem exists.

This problem involves the transfer of grain from the interior of the box, and a grain pickup from all parts of the floor of the box after the main mass of grain has been withdrawn. In doing this it is necessary to elevate the grain to a sufficient height to overlie a storage bin or another truck body or the opening into a railroad car and the discharge of the grain into one or the other of such receptacles.

I have discovered a way to effectively accomplish such transfer and pick-up. I do this by mounting a vertically adjustable support on the side of a truck body or in any other suitable arrangement, and carrying from said support an elevating leg structure in such manner that the delivery end of the leg may be held for axial, vertical, and horizontal adjustments so that the receiving end may enter at desired angles the truck body or box which contains the grain. The mass of grain will then be rapidly drawn upon and elevated by the elevating leg and transferred to an adjacent container until the bottom of the truck body or box has been reached.

I have further discovered that the grain from all parts of the bottom of the truck body or box may effectively be picked up by a supplemental leg member having an elevating belt driven by the same means which drives the elevating belt of the main elevating leg and delivering to the lower end of said main elevating leg whereby the supplemental leg member may reach all parts of the bottom of the box and will pick up and transfer the grain from said parts to the receiving end of the main elevating leg, thus cleaning all grain from the floor thereof.

I have further discovered that an effective means for driving the main elevating belt is to mount a motor, either gas engine or suitably wired electric motor, upon the upper edges of the side walls of the elevating leg and to position the motor thereon so that it may be conveniently reached for control by the operator.

It is, therefore, a principal object of my invention to provide a main elevating leg supported for universal movements so it may be positioned to have one end enter a loaded grain container and the other end overlie another container, with means for rapidly elevating and moving the grain from the loaded grain container to another container in combination with a pick-up leg adapted to operate upon the floor of the loaded conveyor, said pick-up leg adapted to be moved over said floor and pick up the grain therefrom and deliver it to the delivery end of the main conveyor.

It is a further object of my invention to mount a motor, which may be either a gasoline engine or an electric motor having plug-in cable connection with a source of electric energy, upon and connecting the outer edges of the sides of said elevating leg, said motor thus receiving support by and tying together the side members of said open-topped elevating leg.

It is a further object of my invention to support the main elevating leg from a post adapted for vertical adjustments and upon a horizontal bar rotatably mounted on said post and adapted for longitudinal adjustments and upon a link swingingly connected with an end of said bar, so the elevating leg so supported and positioned relative to a truck body or box filled with grain and overlying with its outer end a second container, will first ride upon the grain in said truck body or box until such time as the transfer of grain therefrom shall have progressed to a point to permit the lower receiving end of the elevating leg to contact the floor of the truck body or box and to remove the main bulk of the grain therefrom, and to provide in combination therewith a supplemental elevating leg to pick up grain from all parts of the floor of the truck body or box and transfer it to the receiving end of the main elevating leg.

It is a further object of my invention to provide a supplemental transfer leg adapted to contact portions of the floor of a truck body or box or other grain holding box or bin at points which can not be conveniently reached by the lower end of the main elevating leg, and to provide means for driving a transfer belt arrangement in said supplemental transfer leg, said means effecting drive thereof directly from the driving means of the main elevator leg, the supplemental grain transferring means being arranged and adapted to deliver grain to the receiving part of the main elevating leg at or above its point of contact with the floor, whereby all parts of the floor may have the grain thereon picked up to leave the floor clean and free from grain.

It is a further object of my invention to provide a removable hopper adapted to be positioned at or toward the receiving end of the main elevating belt to conduct thereto grain from the supplemental elevating leg or from a trap door of a grain container.

It is a further object of my invention to provide a main elevating belt in the main elevating leg with a series of flexible flights or carriers which operate in the open-topped chamber of the leg to rapidly elevate and move the grain from one grain container to another.

It is a further object of my invention to provide extended portions of the driven shafts of said main conveyor belt with clutch means and to provide the shafts of the supplemental transfer means with corresponding clutch means, and to provide a flexible axle structure of a suitable desired length which may be clutched to the lower shaft of the main elevating conveyor and to the upper shaft of the supplemental transfer conveyor, whereby the latter will be driven by and from the former and the two conveyors will be driven at the same speed, but at the receiving ends thereof will move in opposite directions.

It is a further object of my invention to form the elevating leg with an open top and the supplemental leg with inclosing bottom, and side walls, and open ends, and to form the end of each of said legs which contacts the floor with a substantially semi-circular outline.

It is a further object of my invention to provide in the main elevating leg and in the supplemental member, elevating devices having thereon flights extending substantially at right angles to the surface of the belt, the supplemental flights being adapted to sweep the floor transversely at the open curved floor-contacting end of the main elevator and of the supplemental transfer member, sweeping up on the former and down and under on the latter.

It is a further object of my invention to provide a supplemental transfer member of such a nature that it can readily be moved from point to point by hand and to provide an adjustable support for the rear end of the member such that the member will be held from transverse oscillation and also such that the angle of the supplemental transfer member may be varied as loading conditions may require.

It is a further object of my invention to provide a support for the main elevating leg, consisting of five members, to wit: 1, a vertical member adapted to be connected with the side of the grain holding box on a truck or a wagon and which will permit various vertical adjustments of the main elevating leg; 2, a head block member rotatably mounted on the upper end of the vertical member and adapted to be swung in horizontal planes throughout an arc of 360° and embodying rollers for the support of the horizontal member; 3, a horizontal member held by the aforesaid rollers and adapted to be projected horizontally various distances from the axial center of the vertical member; 4, a hook having swivel connection with the outer end of the horizontal member; and 5, a two-armed link having connection with the two sides of the main elevating leg and adapting the same to be oscillated on as well as swiveled with the aforesaid hook.

Other objects and advantages of my invention will be given fully and in detail in the following specification, and the novel features thereof by which the aforesaid advantageous results are obtained will be particularly pointed out in the claims.

In the drawings illustrating an application of my invention in one form:

Fig. 1 is a side elevation view with some parts in section showing my invention applied to a truck body in positions (partly indicated in dotted lines) for either unloading or loading said truck body.

Fig. 2 is a plan view of the operative parts of the main elevating leg disassociated from the truck body to which it is designed to be attached, with some parts in section.

Fig. 3 is an enlarged sectional view taken on line 3—3 of Fig. 1.

Fig. 4 is an enlarged transverse sectional view of the invention taken substantially on line 4—4 of Fig. 1.

Fig. 5 is a side elevation view on an enlarged scale of the elevator leg and the motor drive carried thereby.

Fig. 6 is an enlarged detail view of the multiple adjusting means of support for the main elevating leg.

Fig. 7 is a sectional view taken on line 7—7 of Fig. 6, with some parts broken away and in section.

Fig. 8 is an enlarged detail view of the lower end of the main conveyor and the upper end of the supplemental conveyor showing the manner of removably clutching the flexible shaft to drive the two conveyors simultaneously.

Fig. 9 is a side elevation view of the supplemental conveyor disconnected from the main conveyor.

Fig. 10 is an end elevation view of what is shown in Fig. 9.

Fig. 11 is a schematic plan view showing the manner of supporting the main elevating leg for various loading and unloading operations.

Fig. 12 is a transverse sectional view of the elevating leg taken on line 12—12 of Fig. 2.

Fig. 13 is a sectional view taken on line 13—13 of Fig. 2.

Fig. 14 is a side elevation sectional view taken on line 14—14 of Fig. 10.

As illustrated in the general assembly drawings of Figs. 1 and 4, a truck body or box 12, equivalent to a wagon box if that should be used, is mounted in a customary manner upon the chassis of a truck or a wagon. The box 12, as shown in Figs. 2 and 4, includes a customary open-topped compartment 13 adapted to receive and hold for transportation, grain or other granular material. Supporting plates 14 and 15 are shown bolted to the outside of a side wall 16. These plates carry a tubular guide 17 which is thereby held removably united to the outside of the side wall of the truck so as to extend vertically across it, as clearly shown. The plates 14 and 15 and tubular guide 17 may be formed as an integral casting, or may be secured together as a unit in any desired way such as by welding.

While this assemblage is shown in Figs. 2, 3, and 4 as secured to the outside of the grain receiving box, it is conceivable that it might be secured to the inside of a side wall, (in which event the tubular guide would extend through the bottom wall of the box and the crank arrangement hereafter described be operative below said bottom wall), as indicated in Fig. 11.

Upon an extension 18 of plate 14 is mounted a small hand windlass 19 operated by a crank 20 and adapted to wind up or extend a cable 21 which is attached to the lower end 22 of a vertical elevating pipe 23. This pipe extends, for vertical movements, through the guide 17, as clearly shown in Figs. 2, 3, and 4. The elevating pipe 23 is tubular, as shown in detail in Fig. 6. Any suitable means of locking the elevating pipe 23 in fixed position may be employed, such as ratchets and the like. I prefer, however, to form the pipe 23 with a series of transverse holes 23' (Fig. 6) through which a suitable round bar 23" may be inserted to engage the top 24' (Fig. 1) of the tubular guide 17. This will, of course, by normal gravity action, hold the elevating pipe 23 at the point where it may be lifted by action of the crank arm 20.

Mounted to rotate about a vertical axis on the upper end 24 of bar 23 (see Fig. 6) is a pin 25 which is secured by a pin 26 to a tubular member 27. Tubular member 27 is pinned to supporting plates 28 and 29 (Fig. 7) which carry respectively a front roller 30 and a rear roller 31, positioned respectively at the upper rear, and lower forward corners of the supporting plates 28 and 29, as clearly indicated in Figs. 7 and 8. These rollers are provided with V-grooves or circular grooves 32 (Fig. 7) which are engaged respectively by the surfaces at the lower and upper portions of a horizontal tubular carrier arm 33 (Fig. 6). Upon the rear end of the horizontal carrier arm 33 is formed a head 34 which will engage the rear roller 31 to limit the outward projection of the carrier arm. And on the forward end 35 of the carrier arm is positioned a swivel-eye 36 which is supported in swiveling relation upon a nut 37 overlying a washer 38 engaging the top of arm 33.

The swivel-eye 36 carries a hook 39. To this hook may be removably applied a V-link 40 shown in detail in Fig. 4. The V-link comprises a pair of arms 41 and 42, the ends of which will straddle the sides of the elevating leg 43. Upon the side walls of leg 43 are a pair of heads 44 and 45 and the link arms 41 and 42 are provided with loops 46 (Fig. 1) which take over the heads 44 and 45 respectively, thus suspending the leg 43 from the swivel hook 39. The heads 44 and 45 are located toward the upper end of the main elevating leg.

It will be seen from the above that the main elevating leg is supported for universal movements to position it anywhere within the range of its length and the length of the carrier or supporting arm 33. Thus this arrangement and the elevating leg supported by it may be rotated in a horizontal plane throughout a complete circle. It may be elevated by elevation of the vertical elevating bar 23. It may be projected outwardly in all directions in a horizontal plane by projection more or less as required of the supporting arm 33. It may in turn be swung in the arc of a circle about the swivel member 36 and it may be oscillated back and forth in any of its positions upon the V-link 40. The V-link 40 also, because of its form and construction taken in conjunction with the bottom members of the elevating leg, will hold the leg without any tendency to tilt laterally.

The main elevating leg 43 is shown in somewhat enlarged detail in Figs. 2 and 12. It comprises bottom wall 47, and side walls 49 and 50, and a central horizontal partition 51, which divides the space within the walls into an upper open-topped portion 52 and a lower chamber 53 (Fig. 12).

Upon the edges of the side walls 49 and 50, at any point along the length of the leg desired, is mounted a motor 54. This motor is shown as a gasoline engine including a gasoline tank 55, but obviously, where power and wiring connections are available, an electric motor may be employed in place of the gasoline engine. The motor shaft has thereon a flywheel 56 and a V-pulley 56' which is connected by V-belt 57 with a reduction pulley 58 mounted on a side wall. Upon the shaft 59 carrying the reduction pulley 58 is a second V-pulley 60 which in turn connects by V-belt 61 with a drive pulley 62 on a drive shaft 63 journaled in extensions 64 and 65 on side walls 50 and 51. The shaft 63 has thereon spur gears or sprockets 66 and 67 over which run sprocket chains 68 and 69. These sprockets, as shown in Fig. 13, are of small diameter and serve to support and drive the sprocket wheels 66 and 67.

As above stated the sprocket wheels, particularly the hub or solid part thereof, are of small diameter. The center partition 51, as shown in Fig. 13, has a thickness approximately that of the diameter of this hub member. The sprocket wheels 66 and 67 carry projecting supports 70 and 71 (Fig. 2) to which are secured by means of rivets or equivalent members 72, a series of flights 73. These flights are formed of fairly stiff vulcanized rubber which yet have a capacity for some degree of bending at their outer edge portion 74, when they contact the floor of the box or bin from which the grain is being removed. The bottoms of the flight 73, therefore, during their run on top of the dividing partition 51 will be held in substantially close contact with the top wall of this partition.

In place of the sprocket chains 68 and 69 carrying directly the flights 73, it is practicable and in some instances desirable to employ end rollers 48 and 48', over which runs a belt 80. This belt may carry flights or cleats of a less height than the height of the flights 73 and the grain or other granular material will ride up upon the belt. In the main elevating leg there is no top member or cover so the upper portion 52 thereof is entirely open at the top except for the motor secured thereon. The grain or other granular material, therefore can be loaded at the bottom to completely fill the chute formed by upper portion 52 of the elevating leg, and the entire mass of grain can be moved rapidly, which means that the transfer of material may be effected with corresponding rapidity. Also grain can be introduced at any point along the main elevating leg, particularly along that section toward the bottom, whether by the supplemental transfer leg or from a door in the bottom of a truck body or box, and to aid in such introduction a removable hopper may be applied to lead into the trough 52 at any desired point.

The lower ends 75 and 76 of side walls 49 and 50 are curved in the arc of a semi-circle, as clearly shown in Figs. 1 and 5. Such curves run in lines tangent at their inner extremities to the line projected along the inside surface of the bottom wall 47 and the upper edges of side walls 49 and 50, respectively, with its axial center in the plane connecting the ends of these curves. A shaft 77 (Fig. 5) has thereon sprocket wheels 78 and 79 of the same size as the sprocket wheels 66 and 67 over which run the sprocket chains 68 and 69, or the belt, where used, may run over a lower roller 48'.

Thus, when the motor 54 is operating, preferably with a suitable inertia impetus from the flywheel 56, the sprocket chains 68 and 69 will be driven at a fixed speed, which will carry the bases of the flights 73 along the upper surface of the dividing partition 51. Where the flights 73 are employed, the grain is simply pushed along the upper surface of the dividing partition 51; where belt 80 is employed running over rollers 48 and 48', the grain rests directly upon the belt and is moved with it, cleats or flights on the belt maintaining it as the belt ascends to its elevating discharge point.

At the beginning of the unloading and transferring action the curved ends 75 and 76 of side walls 49 and 50 of the elevating leg will swing into the grain. The flights 73 or cleats on the belt 80 will plow through the grain at the end, moving in an upward direction and digging the elevating leg into the grain and effectively loading it as the flights or cleats move upwardly around the end of the leg. In this manner the bottom of the bin or truck body may be reached and where desirable the bottom of the elevating leg may be shifted to insure the loading, elevating, and transfer of the main mass of grain from the container.

This, however, will not effect pick-up of the grain immediately upon or very close to the bottom of the grain container. To make practicable a pick-up of such grain from all parts of the floor, a supplemental transfer device, indicated generally by the numeral 83, is provided. This is shown in detail in Figs. 9 and 10 and is shown in operative positions in Figs. 1 and 4. It consists of side members 84 and 85, bottom member 86, and a central partition 88, dividing the space within the top, bottom, and side walls into upper open space 89 and lower chamber 90. The dimensions of these parts may very well be substantially the same as corresponding parts of the main elevating belt, although this is not necessary and in practice all of these dimensions may, if desired, be made narrower or wider. As shown in Fig. 8 these sets of dimensions are identically the same.

An upper shaft 91 and lower shaft 92 (Fig. 9) are journaled in the side walls 84 and 85 and have thereon pairs of sprocket wheels 93 and 94 at the upper part of the supplemental pick-up leg and sprockets having the same size and position at the lower part thereof.

These sprocket wheels support and driv. sprocket chains 95 and 96 (Fig. 10), and these sprocket chains have secured thereto vulcanized rubber flights 97 which are secured to the sprocket chains in the same manner and are of the same type as flights 73 on the main elevating chain. Also the supplemental pick-up member 83 has the fronts of its side walls curved in the arc of a semi-circle having its radius at the center of shaft 92, as indicated at 98, which is the part of the pick-up leg 83 which is designed to contact the floor, the upper end of the transfer member 83 being held in a suitable and desired elevated position.

To secure the upper end of the pick-up transfer leg 83 at suitable angles to deliver grain picked up from the floor to the main elevating leg 43, either at its bottom or at a point further up thereon, a pair of legs 99 and 100 are secured to the side walls 49 and 50. These legs are made adjustable as to length by providing set screws 101 secured to the side walls which extend through slots 102 and 103 formed along the longitudinal centers of the legs 99 and 100. The bottoms of these leg members, as indicated at 103 and 104, are bevelled so as to make a substantially plane-faced contact with the floor of the grain container and the two legs are preferably secured together by a cross bar 105, thus enabling them to be adjusted as a unit. Other bars 105' extending across and secured to the tops of side members 84 and 85 may also be used as handles for conveniently moving and resetting the supplemental pick-up leg.

For operating the conveyor in the transfer leg 83 the upper shaft 91 of pick-up leg 83 is connected to either the upper driven shaft 63 or preferably to the lower shaft 77 (as shown) of the main elevating leg by means of a flexible shaft 106, as indicated in Fig. 8. The shafts 63 and 77 project at their ends beyond the side members 49 and 50 of the main conveyor belt, as indicated at 107 and 108 respectively. Likewise the upper shaft 91 of the supplemental pick-up device 83 projects beyond the side members 84 and 85, as indicated at 109 and 110.

Many ways of connecting the flexible shaft 106 to the projected ends of driven shaft 63 or 77 and shaft 91 may be employed, as, for example, as shown at the right of Fig. 8, the shaft extensions 107 and 108 may be provided with square sockets for receiving a square member on the end of the flexible shaft 106. I prefer, however, to make the connection as indicated in Fig. 8.

Here the extension 107 is of the shaft alone in circular cross-section, which is adapted to enter a circular guide hole 111 (shown in dotted lines Fig. 8) on a head member 112 formed on one end of the flexible shaft 106. An angularly disposed slot 113 cuts across the annular front of the walls of the head 112 and is adapted to receive the opposite ends of a pin 114 which extend outwardly from each side of the shaft extension 107. A similar head 115 is formed on the other end of flexible shaft 106 which has a slot 116 angularly disposed at right angles to the slot 113 in head 112, and which receives a pin 117 extending through shaft extension 110.

From the above description it will be apparent that however long the flexible shaft 106 may be, driving connection can quickly be made between driven shaft 63 or 77 on an end of the main elevating leg 43 and shaft 91 on the upper end of supplemental transfer leg 83.

From the showing of Fig. 8 it will also be apparent that the connection with the flexible shaft may be made from either side of the main elevating leg and supplemental transfer leg. Indeed, the connection can be made, and under some conditions it is desirable to so make it, from one side of the main elevating leg to the other side of the supplemental leg. Although in Fig. 8 for purposes of illustration, different connecting means respectively are shown, in practice the same connecting means will be used on both sides.

The preferred connection of the flexible shaft is, however, the upper shaft of the supplemental pick-up leg to be connected with the lower shaft of the main elevating leg. With this arrangement or connection the respective sets of flights or belts on the pick-up leg and the main elevating leg move in opposite directions at their grain-receiving ends. The pick-up flights (and flights will always be used for the pick-up leg) will move over and down, wiping the floor with the edge of the flights and gathering the grain from the floor and carrying it up upon the bottom wall of the pick-up leg to any point overlying the bottom end or toward the bottom end of the main elevating leg or overlying any hopper connected therewith.

The flights or the belt of the main elevating leg will move in the opposite direction, that is from beneath upwardly and over the top so as to carry the grain upwardly either on the top of the belt where that is used, or along the upper surface of the central partition, when only the flights 73 are used.

In cases where the grain is taken directly from the bottom of a truck body or other container, a hopper 122 will be removably attached to the lower end of the leg, as indicated in dotted lines on Fig. 4. In such a case the box 12 will be provided with a bottom door or valve 123 of any desired type, which may be opened to permit the grain to flow directly from the bottom. To completely clean out the container with such an arrangement some shoveling may be necessary or the supplemental pick-up device may be used to pick up and empty the space 13 within the box 12. Also for withdrawing the remaining part of the grain from such space it might be desirable to position the main elevating leg 43 to enter the inside of the box, as indicated in dotted lines at 124.

It is the purpose of the pick-up transfer leg 83 to pick up grain or other granular material from the floor of the grain container which could not be taken into the main elevating leg by its operation alone and also to pick up and transfer grain from inaccessible parts of the floor of the box or bin from which it is being moved and to transfer it to or toward the lower end of the main elevating leg whence the grain will be carried to whatever receptacle may be indicated as the place for it to go.

Thus, in Fig. 1, the main elevating leg 43 may be assumed to have substantially emptied the compartment 13 of the truck body 12 and the supplemental pick-up leg 83 has been positioned to reach to the extreme front of the truck and is delivering the grain picked up there to the hopper 122 over the end of the main elevating leg 43.

As shown in Fig. 4, the main elevating leg 43 has emptied the compartment 13 of box or bin 12 and the supplemental pick-up leg has been positioned to extend more or less across the lateral width of the box or bin.

The supplemental leg is, of course, moved about by an operator holding on to the bars 105', and it will be obvious that it can be moved over the floor throughout any radius which will permit delivery of the grain to the receiving end of the main elevating leg 43.

Fig. 11 schematically shows in dotted lines several of almost innumerable positions to be given the main elevating leg 43 and the supplemental transfer leg 83. Thus position a of the main elevator leg shows it taking grain from truck body 118 and delivering it into truck body 119. Position b shows the main elevating leg 43 taking grain from truck body 119 and delivering it into bin 120. In this case supplemental transfer leg 83 is shown in the position to pick up grain from the floor of the truck body 119 and discharge it to the receiving end of main conveyor 43. In position c main elevating leg 43 is shown transferring grain from bin 121 to bin 120. In position d main elevating leg 43 is shown transferring grain from bin 120 to truck body 119, and in this position the supplemental transfer leg 83 is shown picking up grain from a corner of bin 120 and delivering it to the receiving end of main elevating leg 43.

There are only a few of the conceivable combinations of arrangement whereby grain, or other granular material, may be transferred from one receptacle to another. As shown, this transfer is made by means of a support and control of the main elevating leg from a side of one of the receptacles, preferably of a truck body, which makes possible moving the apparatus to any desired point of use. It is conceivable, however, and within the scope of my invention, that the structure might be supported entirely independently of a box or bin which itself contains the grain or other granual material, or which is mounted on wheels.

The advantages of my invention have been quite fully pointed out in the preceding specification. These advantages may be briefly generalized as:

First, great saving of cost. The pick-up of grain by my invention, whereby all of it in the bottoms of boxes or bins may be readily picked up and removed, eliminates the shoveling out of grain which heretofore has had to be done by hand labor.

Second, there is marked reduction of wastage of grain. Under the former methods, including shoveling, much grain has been scattered where it can not be recovered. With the practice of my invention transfer of bodies of grain (or of other granular material) may be effected without waste.

Third, not only is the grain transferred with less labor and substantially no wastage, but the transfer is also made more rapidly; that is, there is a distinct saving in time.

Fourth, the elevating and transferring mechanism is preferably mounted upon a transport vehicle which may include the container to receive the grain or the container from which the grain is transferred so that it may readily be taken to any point where transfer is desired.

Fifth, perhaps the most fundamental advantage of all is that it enables the farmer himself not only to transport the grain to his own storage granary but readily to elevate it from the transporting truck box or wagon box into the bins of his granary where all of it in the past practice has had to be shoveled or carried up in sacks, since dumping and elevating machinery is impractical in the small scale granary storage houses adapted for use by individual farmers.

I claim:

1. In combination with a movable container for grain or other granular material, such as a truck body, a tubular member slidably mounted for vertical movement on the side of said container, crank means for sliding the tubular member and parts carried thereby to any desired elevation, a carrier piece rotatably mounted upon the end of the tubular member and having upper and lower rollers, a horizontal supporting bar held by said rollers for ready projection through the piece, and an elevating leg supported by said horizontal bar, whereby it may be given a large number of different positions for elevating grain from all parts including the floor of said container and transferring it to another place or container.

2. A device for transferring grain from one container to another, comprising an elevating leg, means for supporting the leg so that it may be moved to many different positions extending angularly into and to rest upon the bottom of the grain holding container and to overlie with its discharge end the other container, a main conveyor in said leg, means including a motor on the leg for driving the conveyor, a supplemental leg formed with open ends, an endless chain conveyor therein, adjustable supporting means for holding the supplemental leg at any desired angle and so that it can not be tilted laterally, the sides of said supplemental leg being curved where they contact the floor and so aiding in preventing tilting, said leg being adapted to be readily positioned manually on any part of the floor of the container and at any angle so as to deliver to and upon the lower end of the main conveyor, and means for effecting driving connection between the main conveyor and the supplemental conveyor for driving the latter in any of its said positions.

3. In combination with a container for grain or other granular material, an elevator conveyor removably connected with the container, a support in said connection such that the discharge end of the conveyor will be extended laterally outside and the receiving end thereof will be inside the container and said receiving end will be held to follow by gravity the exhaust of grain from the container until it reaches and rests upon said floor and said discharge end will be above and discharge directly to a place or receptacle for receiving the grain, said support including means to permit universal movement of the conveyor and of its receiving end within and its discharge end without the container, the conveyor including a trough-like passageway, flights movable upwardly along the upper surface of the bottom of and within said passageway, said flight returning below said bottom, the lower end of said passageway being open and having semicircular ends of its side walls for directly contacting the floor of the container, and means for operating the conveyor to cause it to receive grain at any point along the open top of the trough within the container and to elevate it and to discharge it from the upper end of the trough directly outside the lateral limits of the container.

4. In combination with a movable container for grain or other granular material, such as a truck body, an upright rotatable post supported thereon, means for moving said post vertically, a horizontal supporting bar mounted upon the post for rotation therewith in a horizontal plane through an arc of 360 degrees, a depending hook rotatably mounted in the end of the bar, said bar with the hook being slidably mounted on the post to extend varying distances therefrom, an elevating leg having parallel side walls and means connected with both walls for supporting an upper part of the leg from the rotatable hook, said leg extending at an angle from its means of support so the lower part may enter the container at any desired angle to the horizontal bar and the upper part at such selected angle may overlie a bin.

ROY L PATTERSON.